United States Patent
Falk (10) Patent No.: US 12,401,292 B2
(45) Date of Patent: Aug. 26, 2025

(54) METHOD FOR OPERATING A HYBRID RECTIFIER, HYBRID RECTIFIER, AND ELECTROLYTIC SYSTEM HAVING SUCH A HYBRID RECTIFIER

(71) Applicant: SMA Solar Technology AG, Niestetal (DE)

(72) Inventor: Andreas Falk, Kassel (DE)

(73) Assignee: SMA Solar Technology AG, Niestal (DE)

( * ) Notice: Subject to any disclaimer, the term of this patent is extended or adjusted under 35 U.S.C. 154(b) by 287 days.

(21) Appl. No.: 18/188,236

(22) Filed: Mar. 22, 2023

(65) Prior Publication Data
US 2023/0231491 A1    Jul. 20, 2023

Related U.S. Application Data

(63) Continuation of application No. PCT/EP2021/074252, filed on Sep. 2, 2021.

(30) Foreign Application Priority Data

Sep. 24, 2020    (DE) .................. 10 2020 124 964.0

(51) Int. Cl.
H02M 7/23    (2006.01)
H02M 1/00    (2007.01)
(Continued)

(52) U.S. Cl.
CPC ........... H02M 7/23 (2013.01); H02M 1/0095 (2021.05); H02M 1/4283 (2021.05); H02M 7/17 (2013.01); *H02J 3/1892* (2013.01); *H02M 1/42* (2013.01)

(58) Field of Classification Search
CPC .... H02M 1/0095; H02M 1/42; H02M 1/4208; H02M 1/4283; C25B 1/04; C25B 15/02; Y02B 70/10; Y02E 60/38
See application file for complete search history.

(56) References Cited

U.S. PATENT DOCUMENTS

| | | | |
|---|---|---|---|
| 2010/0118574 A1* | 5/2010 | Bourgeau | H02M 7/23 363/128 |
| 2012/0057378 A1* | 3/2012 | Fratta | H02M 7/53871 363/37 |

(Continued)

FOREIGN PATENT DOCUMENTS

| | | |
|---|---|---|
| DE | 10221933 A1 | 12/2003 |
| DE | 102018133641 A1 | 7/2020 |

(Continued)

OTHER PUBLICATIONS

International Preliminary Report on Patentability (English translation), mailing date Dec. 13, 2021. Obtained from WIPO Patentscope on Apr. 16, 2025. (Year: 2021).*

(Continued)

*Primary Examiner* — Fred E Finch, III
(74) *Attorney, Agent, or Firm* — Eschweiler & Potashnik, LLC (57) ABSTRACT

A method for operating a hybrid rectifier includes an AC input, a DC output and a thyristor rectifier arranged in a first path, and a transistor rectifier arranged in a second, parallel path. The method includes when a DC voltage at the DC output of the hybrid rectifier is below a voltage threshold value, operating the hybrid rectifier in a first operating state in which the transistor rectifier is isolated from the DC output and connected to the AC input and the thyristor rectifier is connected both to the AC input and to the DC output. When the DC voltage at the DC output of the hybrid rectifier reaches or exceeds the voltage threshold value, operating the hybrid rectifier in a second operating state in which the thyristor rectifier and the transistor rectifier are each connected to the AC input and to the DC output.

17 Claims, 5 Drawing Sheets

(51) Int. Cl.
*H02M 1/42* (2007.01)
*H02M 7/17* (2006.01)
*H02J 3/18* (2006.01)

(56) References Cited

U.S. PATENT DOCUMENTS

2018/0097450 A1* 4/2018 Andersson ............. H02M 7/25
2021/0317588 A1 10/2021 Falk et al.

FOREIGN PATENT DOCUMENTS

EP 3379679 A1 * 9/2018
GB 2427512 A * 12/2006 ............. H02M 7/17

OTHER PUBLICATIONS

International Search Report dated Nov. 27, 2021 in connection with PCT/EP2021/074252.
Bintz Steffen et al. "Parallel Rectifier for Regenerative Hydrogen Production Utilizing a Combination of Thyristor and PWM-based Topologies" 2018 20th European Conference on Power Electronics and Applications (EPE'18 ECCE Europe), EPE Association, Published Sep. 17, 2018.
Bintz Steffen et al. "Repetitive Controller for Low Grid Current Harmonics in a Hybrid Parallel Electrolysis Rectifier" NEIS Conferences 2019, Published Sep. 19, 2019.
Brauns Jorn et al. "Alkaline Water Electrolysis Powered by Renewable Energy: A Review" Processes, vol. 8, No. 2, Published Feb. 21, 2020.

* cited by examiner

METHOD FOR OPERATING A HYBRID RECTIFIER, HYBRID RECTIFIER, AND ELECTROLYTIC SYSTEM HAVING SUCH A HYBRID RECTIFIER

CROSS REFERENCE TO RELATED APPLICATIONS

This application is a continuation of International Patent Application Number PCT/EP2021/074252, filed on Sep. 2, 2021, which claims priority to German Patent Application number 10 2020 124 964.0, filed on Sep. 24, 2020, and is hereby incorporated by reference in its entirety.

FIELD

The disclosure relates to a method for operating a rectifier, in particular a hybrid rectifier, and to a rectifier, in particular a hybrid rectifier, suitable for carrying out the method. The disclosure also relates to an electrolysis system having such a hybrid rectifier.

BACKGROUND

Electrolysis, for example, of hydrogen, is often carried out using an electrolyzer, which is connected to an AC voltage grid (AC grid) via a rectifier, in particular, via an actively controllable rectifier, and is supplied with power from said grid. Actively controllable rectifiers have semiconductor switches for rectifying AC voltage and/or AC current into DC voltage and/or DC voltage, wherein the semiconductor switches are able to be driven by a control unit of the rectifier for rectifying the current and/or the voltage. Thyristor rectifiers have become established here as rectifiers, since they have lower investment costs compared to other actively controllable rectifier types. Thyristor rectifiers, as they are referred to below, have driveable semiconductor switches using thyristor technology.

System planners of electrolysis systems, and also electrolyzer manufacturers, are planning increasingly large electrolysis systems, meaning that the rated powers of industrial electrolyzers may also increase significantly in the future. In large electrolysis systems, it is possible to use inexpensive thyristor technology to achieve an energy supply that has only a low exchange of reactive power with the AC grid in full-load mode and/or with an amplitude of a grid voltage of the supply AC grid in the lower tolerance band. The grid voltage is used to transfer electric power via the AC grid and is provided by the energy suppliers with values within the defined tolerance band.

However, in particular in the partial load range and/or with an amplitude of the grid voltage in the upper tolerance band, there is a considerable exchange of reactive power with the AC grid. The reactive power may be a combination of displacement reactive power and distortion reactive power. Displacement reactive power is reactive power in the form of fundamentals of the grid voltage. Distortion reactive power is reactive power in the form of harmonics of the grid voltage. Such reactive power, or the exchange thereof with the AC grid, is usually undesirable and may be limited by standards.

In order to reduce the exchange of reactive power with the AC grid, thyristor-based rectifiers—referred to hereinafter as thyristor rectifiers—may be combined with reactive power compensation systems. Known solutions for compensating for reactive power in the form of harmonics (distortion reactive power) and fundamentals (displacement reactive power) are as follows:

a. An activatable passive absorption circuit, possibly also multiple activatable passive absorption circuits, and/or an activatable capacitor bank is/are connected to the AC grid in parallel with the thyristor rectifier. Depending on the reactive power demand of the thyristor rectifier, the absorption circuits and/or the capacitor bank may be activated partially or fully.

b. A self-commutated converter using transistor technology is connected to the AC grid in parallel with the line-commutated thyristor rectifier. Rectifiers having driveable circuit breakers using transistor technology are to below hereinafter as transistor rectifiers. In this solution, the transistor rectifier and thyristor rectifier are not connected to one another on the DC side. The transistor rectifier is used exclusively here for reactive power compensation. A DC link circuit, which is connected to the transistor rectifier on the DC side and has capacitors, serves here as an energy buffer store.

c. The systems mentioned under a and b cannot usually be operated in a grid-forming manner. In a grid-forming mode, the transistor rectifier operates such that, in the event of a voltage or frequency change in the grid voltage, the power of the transistor rectifier is changed instantaneously such that it counteracts this change, that is to say the transistor rectifier operates in a grid-forming and/or grid-supporting manner. Specifically, in a grid-forming mode of the system, it may be desirable for the system to behave like a synchronous machine connected to the AC grid, which changes a power exchanged with the AC grid such that it counteracts a change in frequency and/or voltage in the AC grid. By way of example, in the event of a transient drop in a frequency of the AC grid, the active power drawn from the AC grid may thus be reduced or the active power fed into the AC grid may be increased. This cannot be achieved using the absorption circuits. In the case of the transistor rectifier, a grid-forming mode requires an energy store of sufficiently large dimensions, which is generally not the case with the DC link circuit operating as an energy buffer store. Grid-forming properties are therefore for example provided by a self-commutated transistor rectifier, which is for this purpose conventionally connected to a battery on its DC side.

In order to eliminate the harmonics below the 23rd harmonic in the case of high powers, a complex MV transformer having up to 4 low-voltage systems or 4 individual transformers of different designs may be required in the abovementioned solutions.

Document EP 2 351179 B1 discloses a device for connecting an AC bus and a DC bus, comprising: a set of at least one transistor, which is coupled to the AC bus and to the DC bus, and a set of at least one thyristor, which is coupled to the AC bus and to the DC bus. A microcontroller regulates the current flow through the set of the at least one transistor and the current flow through the set of the at least one thyristor. In doing so, the voltage on the DC bus is regulated such that substantially all of the power flows through the set of the at least one transistor when the power loading of the DC bus is within a first power range of between zero and a first level.

The article *"Parallel Rectifier for Regenerative Hydrogen Production Utilizing a Combination of Thyristor and PWM-based Topologies"*; Steffen Bintz, Manuel Fischer, Jörg Roth-Stielow; 2018 20th European Conference on Power Electronics and Applications (EPE'18 ECCE Europe); Year: 2018|Conference Paper|Publisher: IEEE describes a parallel connection of a thyristor rectifier and a PWM-based actively controlled transistor rectifier for electrolysis. In a normal mode during electrolysis, the thyristor rectifier in this case delivers the majority of the required current, wherein the transistor rectifier is used to correct the input current and the output current.

Document DE 10221933 A1 discloses a grid-operated rectifier bridge that supplies power to a DC link circuit. A capacitor is arranged in the DC link circuit and is charged from the grid by way of a charging circuit before the rectifier bridge is activated. In order to be able to keep the losses in the charging circuit low with regard to a high repetition frequency, the charging circuit has at least one thyristor that is in series with the capacitor and with a branch of the rectifier bridge that is in the same forward direction on the AC voltage grid. The thyristor is in this case fired in synchronicity with the grid frequency and the firing angle is reduced over several grid periods based on the zero crossing of the grid voltage.

Document DE 10 2018 133 641 A1 discloses a method for operating an electrolysis device having a converter that is connected to an AC voltage grid on the AC voltage side via a decoupling impedance and to an electrolyzer on the DC voltage side. At a grid frequency that corresponds to a nominal frequency of the AC voltage grid and is constant over time, the electrolyzer is operated with an electric power that is between 50% and 100% of its rated power. In this case, the converter is operated so as to inject voltage, such that the AC active power drawn from the AC voltage grid is changed directly on the basis of a change and/or a rate of change in the grid frequency in the AC voltage grid.

SUMMARY

The disclosure is directed to a method for operating a combination of a thyristor rectifier and a transistor rectifier. In the method, the intention is to use the existing types of rectifiers more effectively. Moreover, the method is intended to enable a grid-forming and/or grid-supporting mode of the combination of a thyristor rectifier and a transistor rectifier on the AC grid while at the same time minimizing equipment outlay. The disclosure is also directed to a device, operating as a rectifier, suitable for carrying out the method, and also an electrolysis system having such a device.

A hybrid rectifier, as it is referred to below, is a rectifier that has different types of semiconductor switches for rectifying AC voltage and/or AC current on an AC side into DC voltage and/or DC current on a DC side. In such a mode, a DC load for consuming electric power may be connected on the DC side, for example.

According to the disclosure, the hybrid rectifier has at least two rectifiers, for example, two in each case actively controllable rectifiers each having different types of actively controllable semiconductor switches. By way of example, a first rectifier may comprise actively controllable transistor-type semiconductor switches, while a second rectifier of the hybrid rectifier comprises thyristor-type semiconductor switches. Despite the designation of the transistor rectifier as a rectifier, it is always assumed below according to the disclosure that it may be operated bidirectionally with regard to its power flow, that is to say both as a rectifier and as an inverter. The hybrid rectifier may also be operated bidirectionally with regard to a power flowing through it, that is to say also as an inverter, in other words convert DC voltage and/or DC current on the DC side into AC voltage and/or AC current on the AC side. This is the case, for example when, the transistor rectifier operates as an inverter and an active power flowing therefrom in the direction of the AC grid exceeds the absolute value of an active power flowing through the thyristor rectifier in the direction of the DC load. In such a mode, a DC source or an energy store for providing electric power may be connected on the DC side, for example.

In one embodiment, a hybrid rectifier for supplying a DC load with a DC voltage that is rectified from an AC grid and has a variable voltage value, the hybrid rectifier comprises an AC input, a DC output, and a thyristor rectifier arranged in a first path between the AC input and the DC output. The hybrid rectifier further comprises a transistor rectifier that is arranged in a second path connected in parallel with the first path.

A method for operating such a hybrid rectifier comprises the following acts:

When a DC voltage at the DC output of the hybrid rectifier is below a voltage threshold value: operating the hybrid rectifier in a first operating state in which the transistor rectifier is isolated from the DC output of the hybrid rectifier and connected to the AC input of the hybrid rectifier and in which the thyristor rectifier is connected both to the AC input of the hybrid rectifier and to the DC output of the hybrid rectifier, such that a total active power from the AC input to the DC output of the hybrid rectifier is transported via the thyristor rectifier and not via the transistor rectifier.

When the DC voltage at the DC output of the hybrid rectifier reaches or exceeds the voltage threshold value: operating the hybrid rectifier in a second operating state in which the thyristor rectifier and the transistor rectifier are each connected to the AC input of the hybrid rectifier, and to the DC output of the hybrid rectifier, and wherein the total active power is transported from the AC input to the DC output of the hybrid rectifier both via the thyristor rectifier and via the transistor rectifier.

In the first operating state, the transistor rectifier is operated separately from the DC load. It is therefore not able to transfer a second active power from the AC grid to the DC load. Rather, the DC load is supplied with a total active power from the AC grid, this corresponding to a first active power flowing through the thyristor rectifier. In this case, the thyristor rectifier generates a first reactive power. However, since the transistor rectifier, in the first operating state, is able to provide a second reactive power, in particular compensation reactive power, via its AC input, it is able to at least partially compensate for the first reactive power generated by the thyristor rectifier and thus reduce the total reactive power exchanged overall with the AC grid via the AC input of the hybrid rectifier, which total reactive power would otherwise correspond to the first reactive power. To generate the second reactive power, the transistor rectifier may use an energy buffer store that is assigned thereto and is present anyway, for example, a DC link circuit that is present anyway. In the first operating state, however, the transistor rectifier is not able to provide a second active power at its AC input, at least not a second active power that persists over a longer period of time, to the AC grid, since, after a short time, this would lead to a decrease in the DC voltage present across the DC link circuit to values that prevent second active power being fed into the AC grid.

In the second operating state, both power converters, that is to say the thyristor rectifier and the transistor rectifier, are operated in parallel on the DC side. In the second operating state, the thyristor rectifier transfers a first active power to the DC load, while the transistor rectifier transfers a second active power to the DC load, such that the total active power transferred overall to the DC load from the AC grid corresponds to the sum of the first active power and the second active power. In the second operating state, the transistor rectifier is able not only to transfer the second active power to supply the DC load via the DC output, but furthermore also to provide second reactive power for compensating for the first reactive power of the thyristor rectifier and/or for supporting the AC grid via its AC input, such that, even in the second operating state, a total reactive power exchanged overall by the hybrid rectifier with the AC grid via its AC output is able to be reduced or minimized.

The first operating state of the hybrid rectifier largely corresponds to the case described under point a) in the introduction. However, since the transistor rectifier is connected to the DC load in its second operating state and likewise transfers the second active power to the DC load, it is used more efficiently relative to the case outlined under point a) in the introduction, in which the transistor rectifier provides only reactive power to the AC grid.

The thyristor rectifier thus generally takes on significant parts of the base load and the transistor rectifier makes available, for example instantaneously makes available, the remainder of the total active power and the desired second reactive power to compensate for the corresponding first reactive power of the thyristor rectifier, if required by the instantaneous grid conditions. Active and reactive power may in this case be provided in all directions by the transistor rectifier. It is particularly advantageous in this case for the transistor rectifier to be able to be used to provide active power in addition to reactive power compensation. Due to the geometric addition of active and reactive power to give the apparent power, the utilization of the transistor rectifier is thereby far better than if it were to be used only for reactive power compensation or only for providing active power.

The second operating state additionally enables a voltage-regulating mode of the transistor rectifier on the AC grid. It is advantageous here for the DC link circuit of the transistor rectifier to also be able to be charged via the first electric active power of the thyristor rectifier in the second operating state. A drop in the voltage in the DC link circuit caused by a second active power of the transistor rectifier that is fed to the AC grid from the DC link circuit is thus able to be compensated for again at least partially, if necessary also completely, by the first active power flowing from the thyristor rectifier into the DC link circuit. Such an AC circulating current may be useful for grid support in the event of transient frequency changes in the AC grid. In longer-term continuous operation, such an AC circulating current is usually not useful due to the relatively high conversion losses associated therewith.

In a case in which the DC load is formed by an electrolyzer, it is also advantageous, for the voltage-regulating mode of the transistor rectifier, in the second operating state, for a high capacitance inherent to the electrolyzer to be connected in parallel with the DC link circuit of the transistor rectifier. In contrast to the conventional method, it is therefore not necessary to connect the grid-forming transistor rectifier to an additional energy store that needs to be provided separately. On the contrary, this energy store is provided by the capacitive properties of the electrolyzer that is present anyway. In addition, in the second operating state of the hybrid rectifier, the electrolyzer is fed by the first active power of the thyristor rectifier, as a result of which a discharge due to a second active power flowing from the transistor rectifier into the AC grid is able to be counteracted. The transistor rectifier is thereby able to reduce its power instantaneously or even switch to the inverter mode instantaneously if this is necessary to support the AC grid. In such a case, the thyristor rectifier draws power from the grid, which the transistor rectifier feeds back to the grid. Overall, sluggish regulation of the thyristor rectifier may thus be effectively compensated for through the rapid regulation of the grid-forming voltage-regulating transistor rectifier.

In the voltage-regulating mode of the transistor rectifier, an AC voltage set at the AC input of the transistor rectifier may be generated on the basis of a frequency/active power characteristic curve stored in the transistor rectifier, possibly also on the basis of a voltage/reactive power characteristic curve stored in the transistor rectifier. As explained in more detail in connection with FIGS. 4a and 4b, this enables the transistor rectifier to react to a change in the frequency of the AC grid in a grid-supporting manner. By way of example, in the event of a transient increase in the frequency of the AC grid, it is able to increase the second active power flowing through it almost instantaneously and thus increase the total active power flowing overall through the hybrid rectifier and consumed by the DC load. Similarly, in the event of a transient reduction in the frequency of the AC grid, it is able to react by reducing the second active power flowing through it from the AC grid. This results in an overall reduced total active power flowing through the hybrid rectifier and consumed by the DC load. In extreme cases, the hybrid rectifier may even briefly feed total active power from the DC link circuit of the transistor rectifier, which, in particular in the case of an electrolyzer as DC load, is expanded by the large capacitance of the electrolyzer, into the AC grid. In any case, the hybrid rectifier reacts quickly and in a grid-supporting manner to counteract the respective change in frequency. There is no need for an energy store that needs to be provided separately at the DC output of the hybrid rectifier in this regard. On the contrary, the connection to the available capacitance of the electrolyzer that is present anyway as DC load is sufficient. Expenditure for a battery that is otherwise required is dispensed with.

In one embodiment, the thyristor rectifier first starts in a starting process and supplies the electrolyzer with active power. Only when a certain voltage is present on the DC side is the transistor rectifier also activated on the DC side. The transistor rectifier is generally configured to provide only voltages above a minimum DC voltage. If both power converters, that is to say the thyristor rectifier and the transistor rectifier, are operated in parallel, a DC precharging device for the transistor rectifier may therefore be dispensed with, since the thyristor rectifier has already ensured the minimum DC voltage. The transistor rectifier switches to the DC load when the DC voltage present at the DC load reaches the voltage threshold value. The voltage threshold value may be, for example, the peak value of the AC voltage present at the transistor rectifier. A changeover to the second operating state may take place for example when the DC voltage reaches or exceeds the peak value of the AC voltage present at the transistor rectifier, but at least does not fall significantly below it.

The described method thus provides a system in which reactive power compensation is ensured through the use of a hybrid rectifier, wherein multiple, in particular both, rectifiers of the hybrid rectifier are provided for the purpose of transporting active power.

In one embodiment of the method, the transistor rectifier generates a second reactive power in the first operating state in order to at least partially compensate for a first reactive power generated by the thyristor rectifier, such that an exchange of total reactive power between the hybrid rectifier and the AC grid is reduced. The reactive power compensation may thus be implemented as an option without having to accept additional losses caused by an additional self-commutated power converter that is only used for reactive power compensation.

In one embodiment of the method, the second reactive power generated by the transistor rectifier in the first operating state is a combination of distortion reactive power and displacement reactive power. The reactive power compensation is thus also able to also work well at high powers and in particular eliminate the harmonics, with at the same time a simple design of the system.

In one embodiment of the method, the DC load has at least one electrolyzer. The power consumption of the electrolyzer when the DC voltage is present at the level of the voltage threshold value is in this case at least 10% of its rated power.

It is advantageous in one embodiment to connect the transistor rectifier to the electrolyzer on the DC side starting from a power of approximately 20% of the rated power of the electrolyzer, that is to say to transition to the second operating state starting from a DC voltage that corresponds to a power of approximately 20% of the rated power of the electrolyzer. At lower powers, the transistor rectifier outputs only reactive power because it is isolated from a DC source on the DC side. At very low power, a grid-forming mode, also known as GFM, is very difficult anyway. The AC voltage of the transistor rectifier, in the system according to the disclosure with parallel thyristor rectifier and transistor rectifier, may be set higher than with a pure transistor rectifier and thus in a more optimum manner, because the difference between the AC peak voltage at the transistor rectifier and the operating voltage of the electrolyzer becomes lower. This is because a pure transistor rectifier has to be able to start up without the thyristor rectifier, and therefore has to be designed differently. This is one advantage of the hybrid rectifier over a pure rectifier, such as for example a pure transistor rectifier.

In one embodiment of the method, a first amplitude of a first AC voltage at an AC input of the thyristor rectifier exceeds a second amplitude of a second AC voltage at an AC input of the transistor rectifier. The first amplitude of the first AC voltage at the AC input of the thyristor rectifier exceeds the second amplitude of the second AC voltage at the AC input of the transistor rectifier in particular by 20%, or by 50%.

In one embodiment, both power converters, that is to say the thyristor rectifier and the transistor rectifier, are operated on the AC side on AC systems that are galvanically isolated from one another, and are transformed differently so as to provide multiple AC voltages with different AC amplitudes from the AC grid. The different transformation may be carried out, for example, by two separate secondary windings of a transformer, for example, a medium-voltage (MV) transformer or by two different MV transformers. The separation on the AC voltage side is also advantageous just for the reason that a thyristor rectifier acts similarly to a step-down converter, and a transistor rectifier acts similarly to a step-up converter. If both are intended to serve an identical DC voltage range at the same time, then it may be necessary for both to be operated with different voltage amplitudes on their respective AC side. On the other hand, it could be the case that both could serve only a non-overlapping voltage range, if they were to be operated with the same AC voltage amplitude on the AC side.

In one embodiment, both power converters, that is to say both the thyristor rectifier and the transistor rectifier, may be divided into multiple sub-converters and each operated on different secondary windings of the transformer unit.

In one embodiment, the thyristor rectifier takes on approximately ⅔ of the load and the transistor rectifier takes on approximately ⅓ of the load. The transistor rectifier thus has around half the structural capacity of the thyristor rectifier.

In one embodiment of the method, the transistor rectifier comprises a voltage-regulating transistor rectifier the operation of which, in the second operating state, is controlled via a frequency/active power characteristic curve (f(P) characteristic curve) and/or via a voltage/reactive power characteristic curve (U(Q) characteristic curve). In response to a change in a frequency of an AC voltage present at the AC input of the AC grid, the total active power rectified via the hybrid rectifier to be supplied to the DC load is changed almost instantaneously, at least predominantly via a change in the second active power flowing through the transistor rectifier. The described method thus provides a power converter that is also able to be operated in a grid-forming manner. The grid-forming function may also be implemented without any additional effort using an energy store (battery) on the DC side of the hybrid rectifier, even if the hybrid rectifier is operated as a grid-forming power converter. The grid-forming mode characterizes the operating behavior of a voltage-regulating transistor rectifier. In the voltage-regulating mode, a voltage is set by the transistor rectifier, wherein the current is a variable resulting from the boundary conditions that are then present.

The operating behavior is similar to a synchronous machine operated on the AC grid. To implement the voltage-regulating mode (grid-forming mode), a frequency/active power characteristic curve (f(P) characteristic curve) and optionally also a voltage/reactive power characteristic curve (U(Q) characteristic curve) is stored in the transistor rectifier. In this case, taking into account the characteristic curve or the characteristic curves at the AC input of the transistor rectifier, an AC voltage is set by the transistor rectifier so as to give a differential active power in accordance with the stored f(P) characteristic curve and a differential reactive power in accordance with the stored U(Q) characteristic curve. At rated voltage and nominal frequency, the differential active power and differential reactive power is zero and only the setpoint values for active and reactive power that are set for the specified operating point are reached.

With the voltage-regulating mode, the transistor rectifier is able to react to a change in parameters such as frequency and voltage amplitude of the AC voltage of the AC grid in a grid-supporting manner. By way of example, if a frequency of the AC voltage in the AC grid increases, then the voltage-regulating mode automatically and almost instantaneously leads to greater power consumption from the AC grid, in order thus to counteract the increase in the frequency f. Similarly, a change in a voltage amplitude of the AC voltage in the AC grid leads to the transistor rectifier changing its second reactive power such that the second reactive power counteracts the causative change in the voltage amplitude in the AC grid. The changes in second active power and second reactive power brought about by the transistor rectifier via the voltage-regulating mode take place in that a phasor angle and/or a phasor amplitude of the transistor rectifier do not change immediately when a phasor angle and/or a phasor amplitude of the AC grid change and do not require any further communication outlay.

In one embodiment of the method, in the second operating state, the total active power flowing through the hybrid rectifier is divided between the transistor rectifier and the thyristor rectifier by changing the frequency/active power characteristic curve of the transistor rectifier and a phase angle or phase angle control of the thyristor rectifier simultaneously and in a coordinated manner using a control unit of the hybrid rectifier. It is possible in this case for the total active power to remain constant. As an alternative, it is possible for the total active power to reflect a predefined change over time, that is to say it may be set in accordance with a total setpoint curve.

Furthermore, if a new steady state has been created following a change in parameters of the AC voltage of the AC grid, a division of the total active power between the transistor rectifier and the thyristor rectifier may be adjusted through coordinated shifting of the stored f(P) characteristic curve of the transistor rectifier together with a change in the phase angle or phase angle control of the thyristor rectifier.

When reducing the operating power of the electrolyzer away from the rated power, the active power contribution of the transistor rectifier should first be reduced in order to increase the available margin for providing reactive power. When reducing the power of the thyristor rectifier, a reactive power reserve that is sufficient to compensate for the first reactive power of the thyristor rectifier caused by reducing the thyristor active power should always be kept available at the transistor rectifier. If necessary, a division of second active power with respect to first active power may optionally be changed with the total active power remaining the same, by reducing the second active power of the transistor rectifier in order to create the margin.

A hybrid rectifier for supplying a DC load with a DC voltage rectified from an AC grid and having a variable voltage value has an AC input having at least one phase connection for connection of the AC grid and a DC output having two output connections for connection of the DC load. The AC input may have a neutral conductor connection. For example, a single-phase AC input has a neutral conductor connection for connection of a neutral conductor of the AC grid. A neutral conductor connection may be provided for a three-phase AC input, but does not have to be provided; in other words, it is optional. The hybrid rectifier furthermore has a thyristor rectifier arranged in a first path between the AC input and the DC output. The hybrid rectifier furthermore has a transistor rectifier that is arranged in a second path connected in parallel with the first path. The hybrid rectifier additionally has a control unit that is designed and configured to operate the hybrid rectifier, at least in a state of the hybrid rectifier connected to the grid and the DC load, in accordance with the method described above. This results in the advantages already mentioned in connection with the method.

In one embodiment, the hybrid rectifier furthermore has a transformer unit that is arranged between the AC input and the thyristor rectifier and the transistor rectifier and that is designed, using secondary windings formed separately from one another, to transform an AC voltage present on the primary side of the transformer unit and with a third amplitude into a first AC voltage present on the secondary side of the transformer unit and with a first amplitude and a second AC voltage present on the secondary side of the transformer unit and with a second amplitude. The thyristor rectifier is in this case connected to the AC input via at least one first secondary winding of the transformer unit having the first AC voltage with the first amplitude and the transistor rectifier is connected to the AC input via at least one second secondary winding of the transformer unit having the second AC voltage with the second amplitude.

In one embodiment, the transformer unit of the hybrid rectifier has two transformers, each having one primary winding and one secondary winding per phase. In this case, the thyristor rectifier is connected to the AC input via a first transformer of the transformers and the transistor rectifier is connected to the AC input via a second transformer of the transformers. In one embodiment, the two transformers are two separate transformers. The term separate transformers should in this case be understood to mean that each transformer has its own core, that is to say two separate cores are present. Such transformers are usually also accommodated in separate housings. However, it is also possible for the separate cores to be accommodated in a common housing. This makes it possible to provide the thyristor rectifier and the transistor rectifier with different AC input voltages. Because a thyristor rectifier acts similarly to a step-down converter and a transistor rectifier acts similarly to a step-up converter, it is thereby possible to implement a hybrid rectifier in which thyristor rectifier and transistor rectifier make available overlapping voltage ranges for the DC voltage at their DC outputs. In this case, the second operating state of the hybrid rectifier may be within the overlapped range for DC voltages.

In one embodiment, the transformer unit of the hybrid rectifier has a transformer used jointly by the thyristor rectifier and transistor rectifier and having one primary winding and two secondary windings per phase, wherein the thyristor rectifier is connected to a first secondary winding and the transistor rectifier is connected to a second secondary winding of the secondary windings. The two secondary windings are preferably separate secondary windings, that is to say in particular secondary windings that are electrically isolated from one another. Since the secondary windings advantageously have different AC voltages, while they may be connected at one of their ends, they are preferably not connected to one another at both ends.

In one embodiment of the hybrid rectifier, the turns ratios of the first transformer and of the second transformer or the turns ratios of the jointly used transformer from the primary winding to the secondary windings are selected such that the first amplitude of the first AC voltage at an AC input of the thyristor rectifier exceeds the second amplitude of the second AC voltage at an AC input of the transistor rectifier.

In one embodiment, the hybrid rectifier has multiple thyristor rectifiers and/or multiple transistor rectifiers that are each arranged between the AC input and the DC output. The multiple thyristor rectifiers are, in one embodiment, connected in parallel with one another. The multiple transistor rectifiers are, in one embodiment, connected in parallel with one another.

In one embodiment of the hybrid rectifier, the transistor rectifier comprises a voltage-regulating transistor rectifier the operation of which is controlled via a frequency/active power characteristic curve and/or via a voltage/reactive power characteristic curve. If the hybrid rectifier has a multiplicity of transistor rectifiers, at least one, several or each of the transistor rectifiers is designed as a voltage-regulating transistor rectifier the operation of which is controlled via a frequency/active power characteristic curve and/or a voltage/reactive power characteristic curve.

In one embodiment of the hybrid rectifier, a rated power of the transistor rectifier is between 30% and 80% of a rated power of the thyristor rectifier.

One embodiment of an electrolysis system has a hybrid rectifier as described above and an electrolyzer as DC load.

BRIEF DESCRIPTION OF THE FIGURES

Embodiments of the disclosure are explained in more detail below with the aid of figures, in which.

DETAILED DESCRIPTION

A rectifier converts AC voltage and/or AC current on an AC side into DC voltage and/or DC current on a DC side. Some types of rectifiers—for example rectifiers with transistors as semiconductor switches—may also be operated bidirectionally with regard to their power flow, that is to say as inverters. In this operating mode, they convert DC voltage and/or DC current on the DC side into AC voltage and/or AC current on the AC side. A hybrid rectifier, as it is referred to below, is a rectifier that has different types of semiconductor switches for rectifying AC voltage and/or AC current on an AC side into DC voltage and/or DC current on a DC side.

Figure 1:
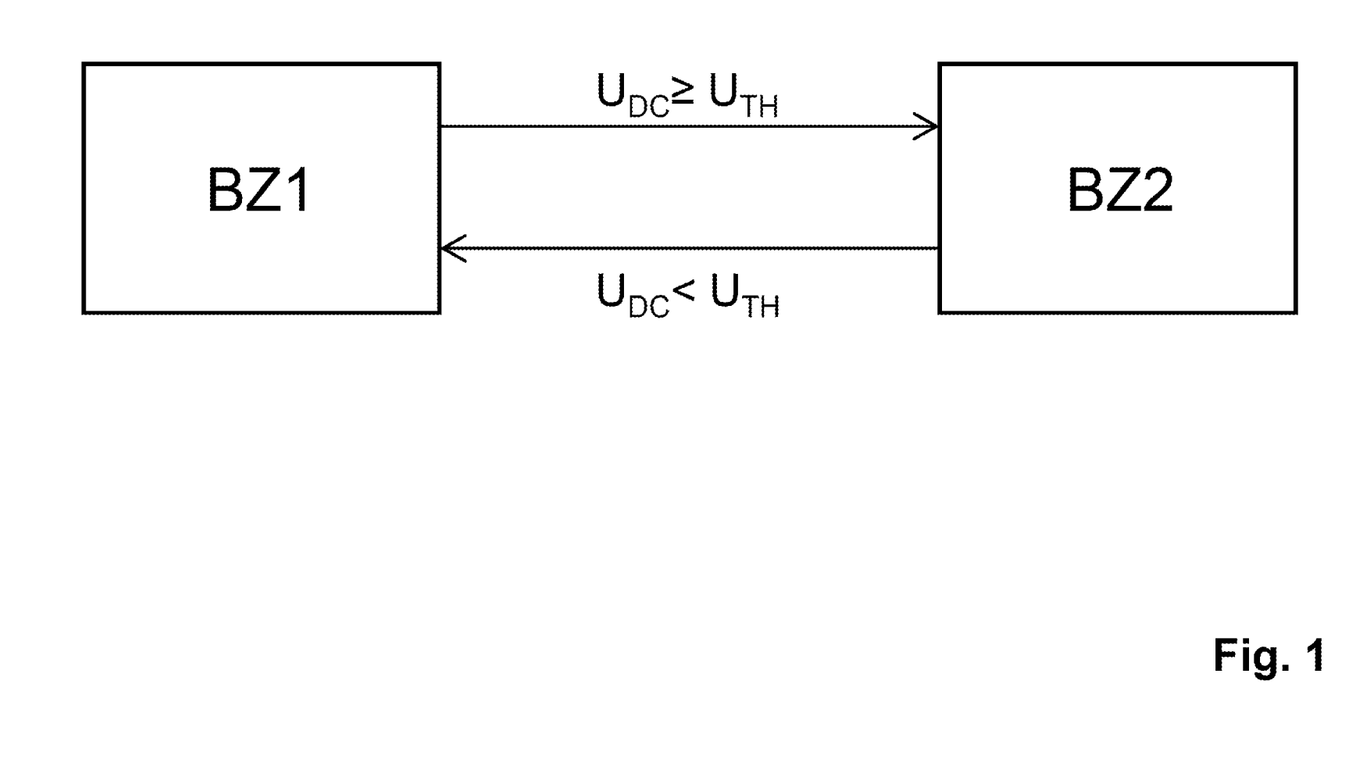
FIG. 1 schematically shows a flowchart of a method for operating a hybrid rectifier.
Figure 2:
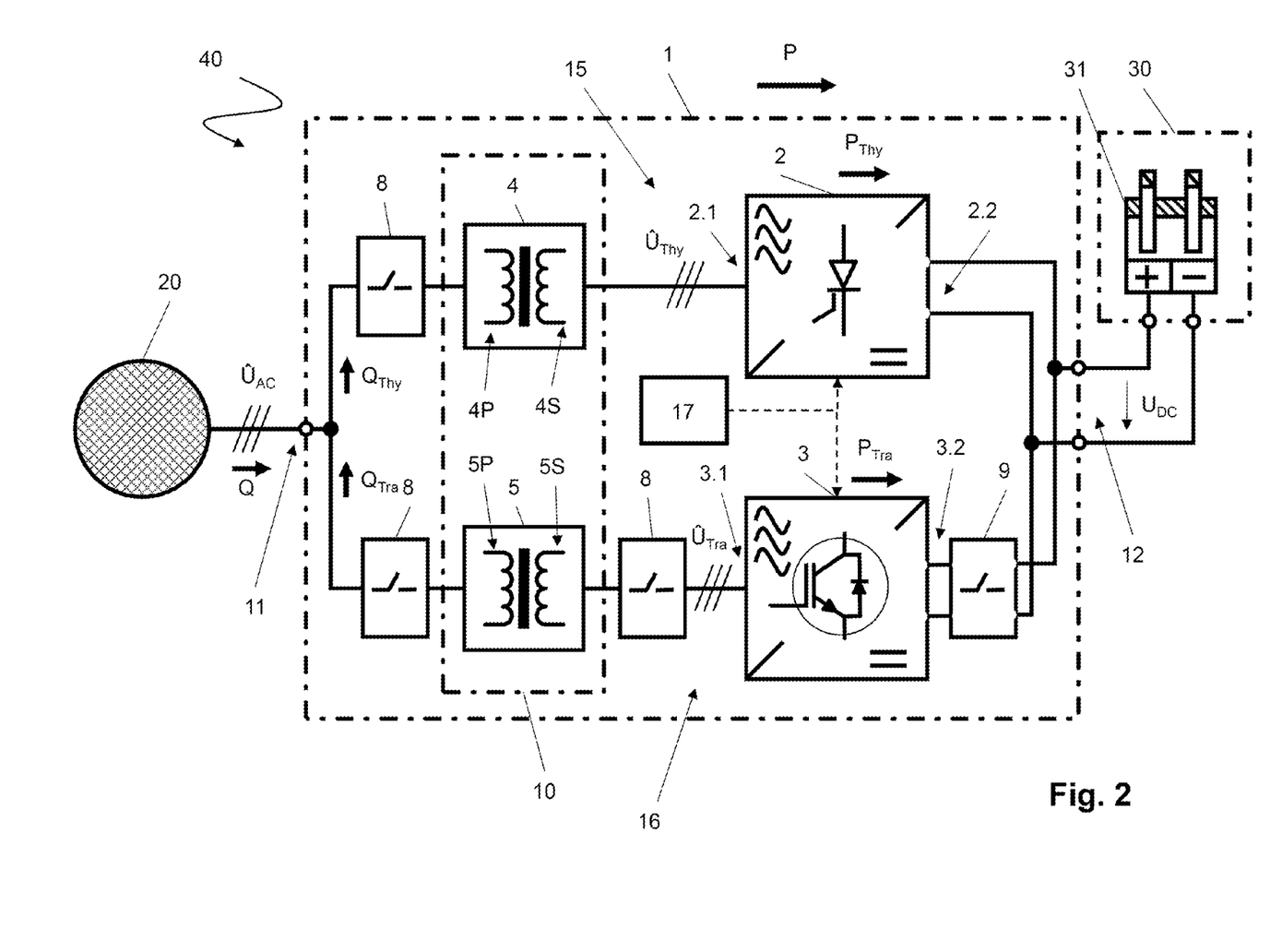
FIG. 2 schematically shows one embodiment of a hybrid rectifier.
Figure 3:
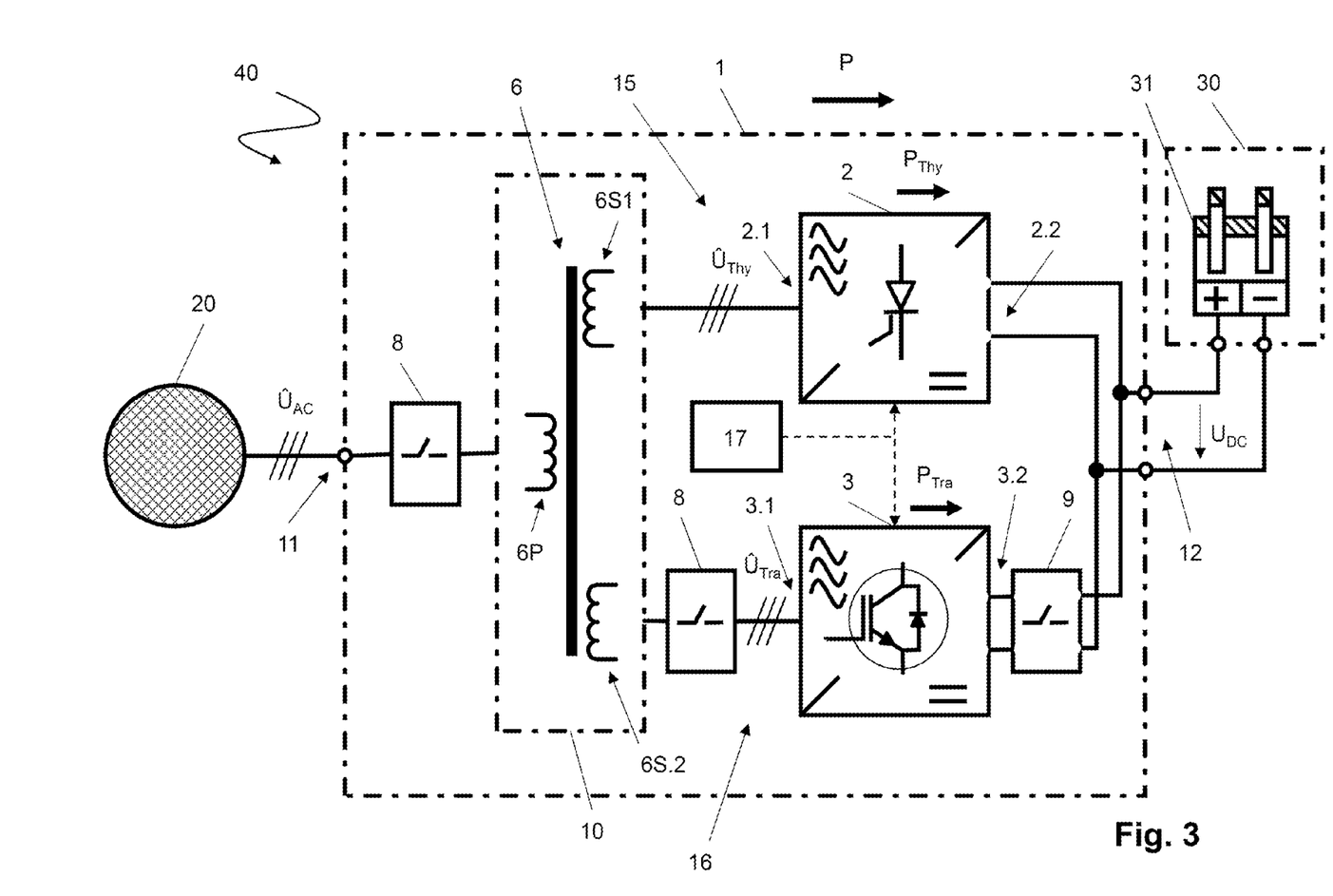
FIG. 3 schematically shows another embodiment of a hybrid rectifier.

FIG. 1 illustrates one embodiment of a method according to the disclosure for operating a hybrid rectifier 1, for example a hybrid rectifier 1 as shown in FIG. 2 or in FIG. 3. In the method, a first operating state BZ1 of the hybrid rectifier 1 is assumed when a DC voltage $U_{DC}$ below a voltage threshold value $U_{TH}$ is present at a DC output 12 of the hybrid rectifier 1. A second operating state BZ2 of the hybrid rectifier is assumed when the DC voltage $U_{DC}$ at the DC output 12 of the hybrid rectifier 1 reaches or exceeds the voltage threshold value $U_{TH}$.

FIG. 2 schematically illustrates one embodiment of the hybrid rectifier 1 according to the disclosure for supplying a DC load 30 with a DC voltage $U_{DC}$ that is rectified from an AC grid 20 and has a variable voltage value. The hybrid rectifier 1 has an AC input 11, a DC output 12 and a thyristor rectifier 2 arranged in a first path 15 between the AC input 11 and the DC output 12. The hybrid rectifier 1 furthermore has a transistor rectifier 3 that is arranged in a second path 16 connected in parallel with the first path 15. The hybrid rectifier 1 is able to be connected to, for example, a multi-phase, in particular, a three-phase, AC voltage via the AC input 11. For this purpose, the AC input 11 of the hybrid rectifier 1 may have several, for example, three, phase connections, possibly also a neutral conductor connection. It is likewise possible to implement the hybrid rectifier 1 as a single-phase hybrid rectifier. In this case, the AC input 11 has only a phase connection and a neutral conductor connection in order to connect the hybrid rectifier 1 to a phase conductor and a neutral conductor of the AC grid 20 via the AC input 11.

In the first operating state BZ1 of the hybrid rectifier 1, in which the transistor rectifier 3 is isolated from a DC output 12 and connected to an AC input 11 and in which the thyristor rectifier 2 is connected both to the AC input 11 and to the DC output 12, a total active power P is transported from the AC input 11 to the DC output 12 via the thyristor rectifier 2. A first active power $P_{Thy}$ is in this case transported via the thyristor rectifier 2, while no second active power $P_{Tra}$ transported via the transistor rectifier 3. In the first operating state BZ1, the total active power P thus corresponds to the first active power $P_{Thy}$.

In the second operating state BZ2 of the hybrid rectifier 1, the thyristor rectifier 2 and the transistor rectifier 3 are each connected to the AC input 11, on the one hand, and to the DC output 12, on the other hand. In the second operating state BZ2, the total active power P is transported from the AC input 11 to the DC output 12 of the hybrid rectifier 1 both via the thyristor rectifier 2 and via the transistor rectifier 3. The first active power $P_{Thy}$ is transported via the thyristor rectifier 2, and the second active power $P_{Tra}$ is transported via the transistor rectifier 3. In the second operating state BZ2, the total active power P thus corresponds to a sum of the first active power $P_{Thy}$ and the second active power $P_{Tra}$.

The thyristor rectifier 2 has an AC input 2.1 and a DC output 2.2. The transistor rectifier 3 has an AC input 3.1 and a DC output 3.2. The DC output 3.2 of the transistor rectifier 3 may be connected to the DC output 12 of the hybrid rectifier or isolated from the DC output 12 via a DC isolation unit 9. Such isolation may be present, for example, in the first operating state BZ1 of the hybrid rectifier 1 when the DC isolation unit 9 is open. The hybrid rectifier 1 may then be put into the second operating state BZ2 by closing the DC isolation unit 9. The thyristor rectifier 2 and the transistor rectifier 3 may be isolated from the AC grid 20 on their AC side via AC isolation units 8. Such isolation may be desirable for maintenance purposes, for example. The DC isolation unit 9 and the AC isolation units 8 may be driven, for example, by the control unit 17.

The hybrid rectifier 1 furthermore has a transformer unit 10 having a first transformer 4 and a second transformer 5. The first transformer 4 has a first primary winding 4P and a first secondary winding 4S. The second transformer 5 has a second primary winding 5P and a second secondary winding 5S. The AC voltage present at the AC input 11 of the hybrid rectifier 1 and with a third amplitude $\hat{U}_{AC}$ is converted into a first AC voltage with a first amplitude $\hat{U}_{Thy}$ by the first transformer 4. The first AC voltage with the first amplitude $\hat{U}_{Thy}$ is then present at the AC input 2.1 of the thyristor rectifier 2. The AC voltage present at the AC input 11 and with the third amplitude $\hat{U}_{AC}$ is converted into a second AC voltage with a second amplitude $\hat{U}_{Tra}$ by the second transformer 5. The voltage with the second amplitude $\hat{U}_{Tra}$ is then present at the AC input 3.1 of the transistor rectifier 3. In one embodiment, the transformer unit illustrated in FIG. 2 has separate transformers 4, 5, each having a core that is present separately. The transformers 4, 5 with their separate cores may each be present in a separate housing or in a common housing. Providing separate transformers 4, 5 makes it possible to convert the AC voltage with the third amplitude $U_{AC}$ into different AC input voltages for the thyristor rectifier 2 and the transistor rectifier 3.

If the AC voltage at the AC input 11 comprises multiple, for example three, phases, then a first and a second transformer 4, 5 may be provided per phase. It is also possible, in the case of a multi-phase AC voltage, for only a first and a second transformer 4, 5 to be provided and for a first primary winding 4P, a first secondary winding 4S, a second primary winding 5P and a second secondary winding 5S to be provided per phase.

The hybrid rectifier 1 exchanges a total reactive power Q with the AC grid 20. The DC load 30 is supplied with a total active power P via the hybrid rectifier 1. The first active power $P_{Thy}$ is transported via the thyristor rectifier 2, and the second active power $P_{Tra}$ is transported via the transistor rectifier 3. The first active power $P_{Thy}$ and the second active power $P_{Tra}$ add together to give the total active power P. The thyristor rectifier 2 generates a first reactive power $Q_{Thy}$ and the transistor rectifier 3 generates a second reactive power $Q_{Tra}$, which add together to give the total reactive power Q. The second reactive power $Q_{Tra}$ generated by the transistor rectifier 3 is in this case selected relative to the first reactive power $Q_{Thy}$ such that it at least partially, possibly also completely, compensates for the first reactive power $Q_{Thy}$. The total reactive power Q exchanged with the AC grid 20 may thereby be reduced or minimized.

The hybrid rectifier 1 in FIG. 2 is part of an electrolysis system 40 that has an electrolyzer 31 as the DC load 30. The semiconductor switches of the thyristor rectifier 2 and of the transistor rectifier 3 are driven by a control unit 17. The control unit 17 has a computer and a memory and is configured to operate the hybrid rectifier 1 in accordance with the described method.

FIG. 3 schematically illustrates another embodiment of a hybrid rectifier 1. Essential components of the hybrid rectifier illustrated in FIG. 3 correspond to those of the hybrid rectifier illustrated in FIG. 2. They are provided with the same reference signs in FIG. 2 and FIG. 3.

The differences with respect to the embodiment of FIG. 2 are illustrated in particular below. The transformer unit 10 illustrated in FIG. 3 has a transformer 6 that comprises a primary winding 6P, a first secondary winding 6S1 and a second secondary winding 6S2. The transformer 6, in one embodiment, has a single core to which the windings 6P, 6S1, 6S2 are attached, such that the first secondary winding 6S1 and the second secondary winding 6S2 are inductively coupled to the one primary winding 6P. The AC voltage present at the AC input 11 of the hybrid rectifier 1 and with the third amplitude $\hat{U}_{AC}$ is converted into the voltage with the first amplitude $\hat{U}_{Thy}$ by the transformer 6, via the primary winding 6P and the first secondary winding 6S1. The voltage with the first amplitude $\hat{U}_{Thy}$ is then present at the AC input 2.1 of the thyristor rectifier 2. The AC voltage with the third amplitude $\hat{U}_{AC}$ is also converted into the second AC voltage with the second amplitude $\hat{U}_{Tra}$ by the transformer 6, via the primary winding 6P and the second secondary winding 6S2. The second AC voltage with the second amplitude $\hat{U}_{Tra}$ is then present at the AC input 3.1 of the transistor rectifier 3. Providing separate secondary windings 6S1, 6S2 makes it possible to convert the AC voltage present at the AC input 11 and with the third amplitude $\hat{U}_{AC}$ into different AC input voltages for the thyristor rectifier 2 and the transistor rectifier 3.

If the AC voltage at the AC input 11 comprises multiple, for example, three, phases, then one transformer 6 may be provided per phase. It is also possible, in the case of a multi-phase AC voltage, for only one transformer 6 to be provided and for a first primary winding 6P, a first secondary winding 6S1 and a second secondary winding 6S2 to be provided per phase.

Possibilities for the voltage-regulating mode of the transistor rectifier 3 assigned to the hybrid rectifier 1 are described below with reference to FIGS. 4a and 4b. With the voltage-regulating mode, the transistor rectifier 3 is able to react to a change in parameters such as frequency and third amplitude $\hat{U}_{AC}$ of the AC voltage of the AC grid 20 in a grid-supporting manner. A frequency/active power characteristic curve (f(P) characteristic curve) 41 is stored in the transistor rectifier 3 for the voltage-regulating mode. The f(P) characteristic curve 41 specifies the frequency f at which an AC voltage is set at the AC input 3.1 of the transistor rectifier 3. The transistor rectifier 3 behaves similarly to a synchronous machine connected to the AC grid 20 via the f(P) characteristic curve 41. By way of example, if a frequency f of the AC voltage in the AC grid 20 increases, then the voltage-regulating mode automatically and almost instantaneously leads to an increase in the second active power $P_{Tra}$ flowing through the transistor rectifier 3 in the direction of the DC load 30, and thus to greater power consumption of active power P from the AC grid 20 in order thus to counteract the increase in the frequency f. If on the other hand the frequency f of the AC voltage in the AC grid 20 drops, then the voltage-regulating mode results almost instantaneously in a decrease in the second active power $P_{Tra}$ flowing through the transistor rectifier 3 in the direction of the DC load 30, and thus to a lower power consumption of the DC load 30. The behavior of the voltage-regulating transistor rectifier 3 is described in more detail in connection with FIG. 4a by way of example for a change, in particular an increase in the frequency f.

Figure 4A:
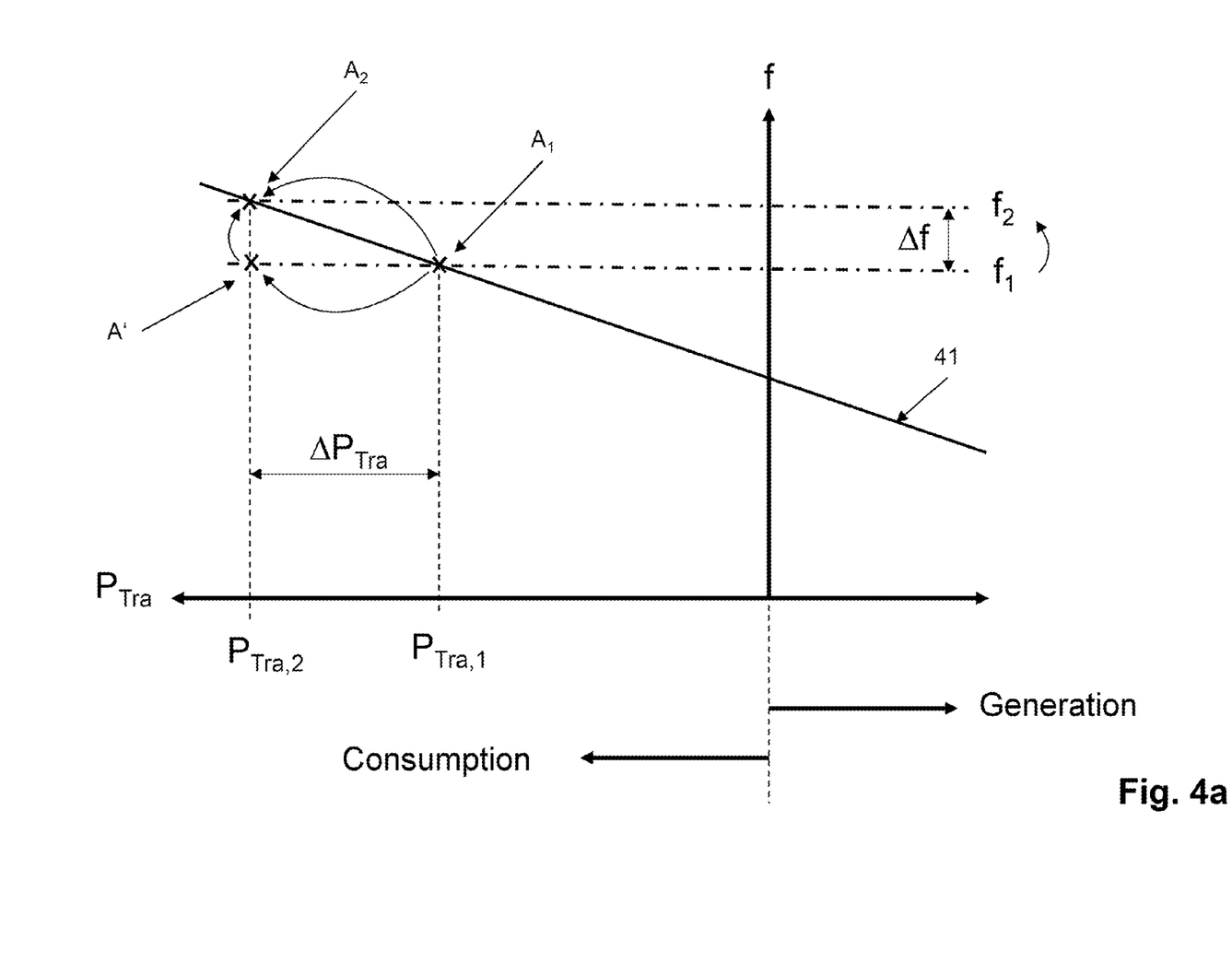
FIG. 4a shows a schematic illustration of the behavior of a voltage-regulating transistor rectifier when the frequency f changes, using the example of an f(P) characteristic curve in one embodiment.
Figure 4B:
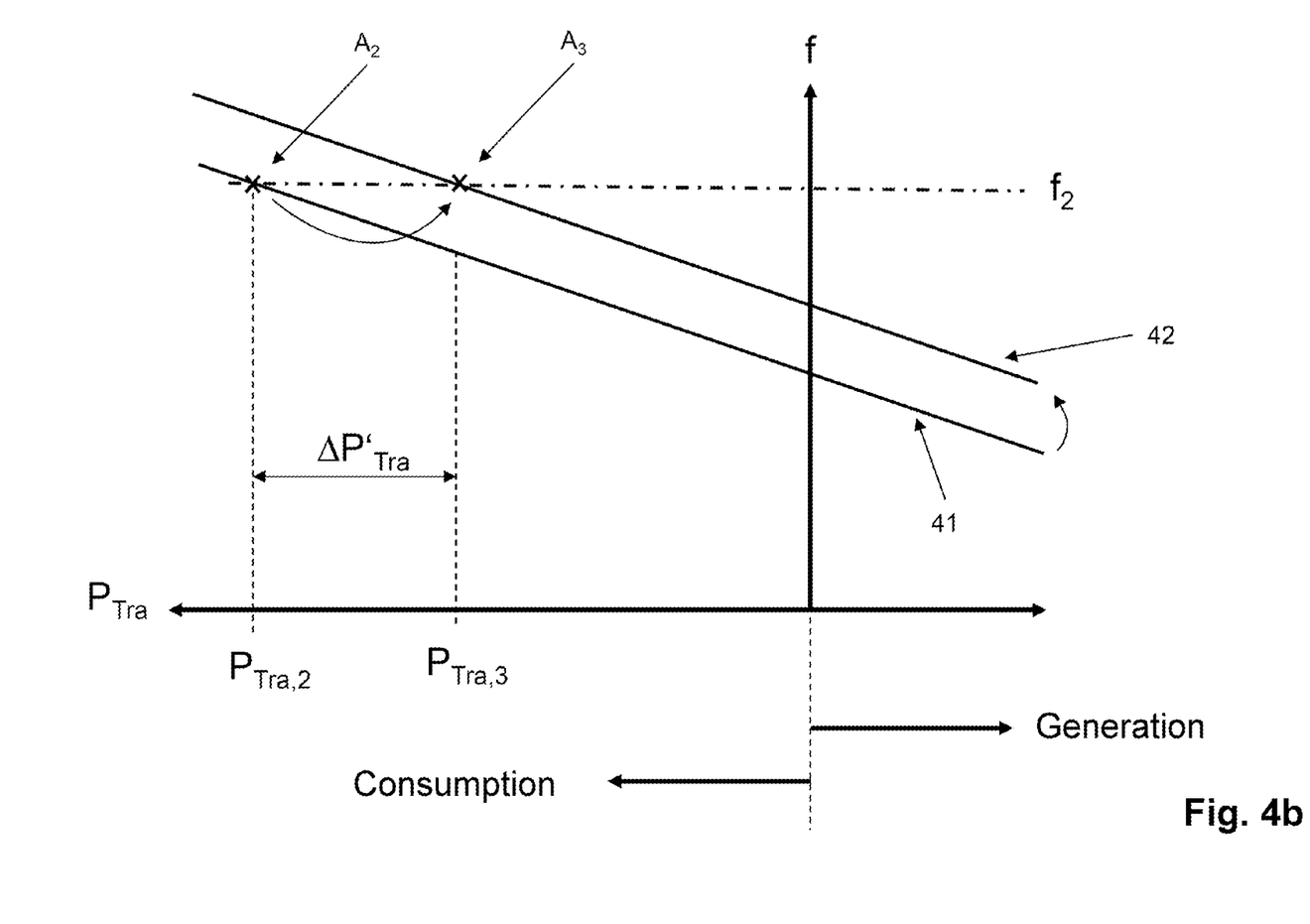
FIG. 4b shows a schematic illustration of the behavior of the voltage-regulating transistor rectifier when the f(P) characteristic curve changes, in one embodiment.

FIG. 4a illustrates, by way of example, a frequency/active power characteristic curve 41, as may be stored in a voltage-regulating transistor rectifier 3 of the hybrid rectifier 1, for example. It specifies the frequency f of the AC voltage that the transistor rectifier 3 sets at its AC input 3.1 with a second active power $P_{Tra}$ flowing through it. In this case, that part of the x-axis pointing to the left (consumption) indicates an active power flowing from the AC grid 20 through the transistor rectifier 3 in the direction of the DC load 30, while that part of the x-axis pointing to the right (generation) indicates an active power flowing from the transistor rectifier 3 in the direction of the AC grid 20. The starting point in FIG. 4a is a first operating point $A_1$ of the transistor rectifier 3, which results from a point of intersection of the frequency $f_1$ present in the AC grid 20 and the f(P) characteristic curve 41 stored in the transistor rectifier 3. At this first operating point $A_1$, an active power $P_{Tra,1}$ flows from the AC grid 20 in the direction of the DC load 30, for example, the electrolyzer 31, through the transistor rectifier 3. If the frequency f in the AC grid 20 then changes from the value $f_1$ to a value $f_2$, then this leads to a phase difference at the AC input 3.1 of the transistor rectifier 3, which initially continues to set the voltage at the frequency $f_1$. However, the phase difference generates an additional current from the AC grid 20 into the transistor rectifier 3, causing the second active power $P_{Tra}$ to increase. The increase in the second active power $P_{Tra}$ is detected by the transistor rectifier 3, which adjusts the frequency f of the AC voltage set thereby at its AC input 3.1 in accordance with the stored f(P) characteristic curve 41. The initial first operating point $A_1$ thereby migrates, via a temporary operating point A', to a second operating point $A_2$, which in turn is a point of intersection between the frequency $f_2$ prevailing in the AC grid 20 and the f(P) characteristic curve 41 of the transistor rectifier 3. At the new second operating point $A_2$, a larger second active power $P_{Tra,2}$ then flows at the higher frequency $f_2$ through the transistor rectifier 3 than was the case at the first operating point $A_1$ with the second active power $P_{Tra,1}$.

Similarly, a change in a third amplitude $\hat{U}_{AC}$ of the AC voltage in the AC grid 20 in conjunction with a voltage/reactive power characteristic curve stored in the transistor rectifier 3 leads to the transistor rectifier 3 changing its second reactive power $Q_{Tra}$ such that the second reactive power $Q_{Tra}$ counteracts the causative change in the third amplitude $\hat{U}_{AC}$ in the AC grid 20. The changes in second active power $P_{Tra}$ and second reactive power $Q_{Tra}$ brought about by the transistor rectifier 3 via the voltage-regulating mode take place automatically in this case and do not require any further communication outlay.

If a new steady state has been created following a change in parameters of the AC voltage of the AC grid 20, a division of the total active power P between the transistor rectifier 3 and the thyristor rectifier 2 may be adjusted through coordinated shifting of the stored f(P) characteristic curve 41 together with a change in the phase angle. Both changes, that of the first active power $P_{Thy}$ and that of the second active power $P_{TRa}$, may take place such that the total active power P flowing through the hybrid rectifier 1 in the direction of the DC load 30 does not change. The behavior of the voltage-regulating transistor rectifier 3 when the f(P) characteristic curve 41 changes is explained in detail in connection with FIG. 4b.

After a new state of equilibrium has formed between the transistor rectifier 3 of the hybrid rectifier 1 and the AC grid 20, the f(P) characteristic curve 41 may be changed, for example, shifted, by the control unit 17. By way of example, FIG. 4b illustrates that the original f(P) characteristic curve 41 is shifted in the direction of higher frequency f to the changed f(P) characteristic curve 42. The second operating point $A_2$ accordingly migrates almost instantaneously with the shift of the f(P) characteristic curve 41 to the third operating point $A_3$, at which, with an otherwise unchanged frequency $f_2$, an updated second active power $P_{Tra,3}$ flows through the transistor rectifier 3, which updated second active power (in the example illustrated in FIG. 4b) is smaller than the original second active power $P_{TRa,2}$, associated with the second operating point A2, of the transistor rectifier 3. The phase angle of the thyristor rectifier 2 may likewise be changed in a coordinated manner at the same time as the change from the original f(P) characteristic curve 41 to the changed f(P) characteristic curve 42 and the resulting change in the second active power $P_{Tra}$ of the transistor rectifier 3. Both changes may be coordinated via the control unit 17 and take place such that the total active power P flowing through the hybrid rectifier 1 remains unchanged, but is divided differently between the transistor rectifier 3 and the thyristor rectifier 2 of the hybrid rectifier 1.

Similarly to what is explained in connection with FIG. 4b, a voltage/reactive power characteristic curve stored in the transistor rectifier 3 may also be shifted, possibly together and in a manner coordinated with a change in the phase angle or the phase angle control of the thyristor rectifier 2, in order to change the second reactive power $Q_{Tra}$ generated by the transistor rectifier 3. The changes in the operating points $A_1$, A', $A_2$, $A_3$ illustrated in FIGS. 4a and 4b may take place such that, during the change, only a negligible deviation from the f(P) characteristic curve—as well as from a U(Q) characteristic curve—occurs. In other words, the operating point on the respective characteristic curve 41 may shift while it is being changed such that it always corresponds at least approximately to the point of intersection of the f(P) characteristic curve and the frequency f prevailing in the AC grid 20, or to a point of intersection of the U(Q) characteristic curve and the voltage amplitude $\hat{U}_{AC}$ prevailing in the AC grid 20, or corresponds in particular to the second voltage amplitude $\hat{U}_{Tra}$ of the second AC voltage present at the AC input 3.1 of the transistor rectifier 3.

What is claimed is:

1. A method for operating a hybrid rectifier for supplying a DC load with a DC voltage that is rectified from an AC grid and has a variable voltage value, wherein the hybrid rectifier comprises an AC input, a DC output and a thyristor rectifier arranged in a first path between the AC input and the DC output, wherein the hybrid rectifier further comprises a transistor rectifier arranged in a second path connected in parallel with the first path, comprising:

when a DC voltage at the DC output of the hybrid rectifier is below a voltage threshold value: operating the hybrid rectifier in a first operating state in which the transistor rectifier is isolated from the DC output and connected to the AC input and in which the thyristor rectifier is connected both to the AC input and to the DC output, such that a total active power from the AC input to the DC output is transported via the thyristor rectifier as a first active power and not via the transistor rectifier, and when the DC voltage at the DC output of the hybrid rectifier reaches or exceeds the voltage threshold value: operating the hybrid rectifier in a second operating state in which the thyristor rectifier and the transistor rectifier are each connected to the AC input and to the DC output, and wherein the total active power is transported from the AC input to the DC output of the hybrid rectifier both via the thyristor rectifier as the first active power and via the transistor rectifier as a second active power.

2. The method as claimed in claim 1, wherein the transistor rectifier generates a second reactive power in the first operating state in order to at least partially compensate for a first reactive power generated by the thyristor rectifier, such that an exchange of total reactive power between the hybrid rectifier and the AC grid is reduced.

3. The method as claimed in claim 2, wherein the second reactive power generated by the transistor rectifier in the first operating state is a combination of distortion reactive power and displacement reactive power.

4. The method as claimed in claim 1, wherein the DC load comprises an electrolyzer and wherein a power consumption of the electrolyzer when the DC voltage is present at the voltage threshold value is at least 10% of its rated power.

5. The method as claimed in claim 1, wherein a first amplitude of a first AC voltage at an AC input of the thyristor rectifier exceeds a second amplitude of a second AC voltage at an AC input of the transistor rectifier.

6. The method as claimed in claim 1, wherein the transistor rectifier comprises a voltage-regulating transistor rectifier controlled via a frequency/active power characteristic curve and/or via a voltage/reactive power characteristic curve, such that, in response to a change in a frequency of an AC voltage of the AC grid that is present at the AC input, the total active power rectified via the hybrid rectifier to be supplied to the DC load is changed at least predominantly via a change in the second active power flowing through the transistor rectifier.

7. The method as claimed in claim 6, wherein the total active power flowing through the hybrid rectifier is divided between the transistor rectifier and the thyristor rectifier by changing the frequency/active power characteristic curve of the transistor rectifier and a phase angle of the thyristor rectifier in a coordinated manner using a control unit, wherein the total active power optionally remains constant.

8. A hybrid rectifier for supplying a DC load with a DC voltage that is rectified from an AC grid and has a variable voltage value, comprising:

an AC input having at least one phase connection configured to connect to the AC grid, a DC output having two output connections configured to connect to the DC load, a thyristor rectifier arranged in a first path between the AC input and the DC output, and a transistor rectifier that is arranged in a second path connected in parallel with the first path, wherein the hybrid rectifier additionally comprises a control unit configured to operate the hybrid rectifier in one of a first state and a second state, wherein:

when a DC voltage at the DC output of the hybrid rectifier is below a voltage threshold value: the hybrid rectifier is operated in the first state in which the transistor rectifier is isolated from the DC output and connected to the AC input and in which the thyristor rectifier is connected both to the AC input and to the DC output, such that a total active power from the AC input to the DC output is transported via the thyristor rectifier as a first active power and not via the transistor rectifier, and when the DC voltage at the DC output of the hybrid rectifier reaches or exceeds the voltage threshold value: the hybrid rectifier is operated in the second state in which the thyristor rectifier and the transistor rectifier are each connected to the AC input and to the DC output, and wherein the total active power is transported from the AC input to the DC output of the hybrid rectifier both via the thyristor rectifier as the first active power and via the transistor rectifier as a second active power.

9. The hybrid rectifier as claimed in claim 8, further comprising a transformer unit arranged between the AC input and both the thyristor rectifier and the transistor rectifier, and wherein the transformer unit is configured, using secondary windings formed separately from one another, to transform an AC voltage present on a primary side, connected to the AC input, and having a third amplitude into a first AC voltage present on a first secondary side coupled to the thyristor rectifier and having a first amplitude and a second AC voltage present on a second secondary side coupled to the transistor rectifier and having a second amplitude.

10. The hybrid rectifier as claimed in claim 9, wherein the transformer unit comprises a first transformer and a second transformer, each having one primary winding and one secondary winding per phase, wherein the thyristor rectifier is connected to the AC input via the first transformer and the transistor rectifier is connected to the AC input via the second transformer of the transformer unit.

11. The hybrid rectifier as claimed in claim 10, wherein a turns ratios of the first transformer and of the second transformer are selected such that the first amplitude of the first AC voltage at an AC input of the thyristor rectifier exceeds the second amplitude of the second AC voltage at an AC input of the transistor rectifier.

12. The hybrid rectifier as claimed in claim 9, wherein the transformer unit comprises a jointly used transformer that has just one primary winding and a first secondary winding and a second secondary winding per phase, wherein the thyristor rectifier is connected to the first secondary winding and the transistor rectifier is connected to the second secondary winding.

13. The hybrid rectifier as claimed in claim 12, wherein the turns ratios of the jointly used transformer are selected such that the first amplitude of the first AC voltage at an AC input of the thyristor rectifier exceeds the second amplitude of the second AC voltage at an AC input of the transistor rectifier.

14. The hybrid rectifier as claimed in claim 8, wherein the hybrid rectifier comprises multiple thyristor rectifiers or multiple transistor rectifiers, or both, that are each arranged between the AC input and the DC output.

15. The hybrid rectifier as claimed in claim 8, wherein the transistor rectifier comprises a voltage-regulating transistor rectifier controlled via a frequency/active power characteristic curve and/or via a voltage/reactive power characteristic curve, or, when the hybrid rectifier comprises multiple transistor rectifiers, at least one, several or each of the transistor rectifiers comprises the voltage-regulating transistor rectifier controlled via the frequency/active power characteristic curve and/or via the voltage/reactive power characteristic curve.

16. The hybrid rectifier as claimed in claim 8, wherein a rated power of the transistor rectifier is between 30% and 80% of a rated power of the thyristor rectifier.

17. An electrolysis system having the hybrid rectifier as claimed in claim 8 and an electrolyzer as the DC load.

* * * * *